US012561226B2

(12) United States Patent　(10) Patent No.:　US 12,561,226 B2
Braunshtein et al.　(45) Date of Patent:　Feb. 24, 2026

(54) AUTOMATICALLY RETRIEVING DEBUGGING INFORMATION BASED ON A DECLARATIVE SPECIFICATION FOR DEBUGGING A SOFTWARE APPLICATION

(71) Applicant: Red Hat, Inc., Raleigh, NC (US)

(72) Inventors: Ori Braunshtein, Lehavim (IL);
Michael Gourin, Jerusalem (IL)

(73) Assignee: Red Hat, Inc., Raleigh, NC (US)

( * ) Notice: Subject to any disclaimer, the term of this patent is extended or adjusted under 35 U.S.C. 154(b) by 188 days.

(21) Appl. No.: 18/313,170

(22) Filed: May 5, 2023

(65) Prior Publication Data

US 2024/0370351 A1　Nov. 7, 2024

(51) Int. Cl.
*G06F 9/44*　(2018.01)
*G06F 11/3604*　(2025.01)
*G06F 11/362*　(2025.01)

(52) U.S. Cl.
CPC ........ *G06F 11/3612* (2013.01); *G06F 11/366* (2013.01)

(58) Field of Classification Search
CPC .......................... G06F 11/3612; G06F 11/366
See application file for complete search history.

(56) References Cited

U.S. PATENT DOCUMENTS 10,949,338 B1 *　3/2021　Sirianni ................. G06N 20/10
2005/0055634 A1 *　3/2005　Burns ................... G06F 16/972
715/251

2015/0304182 A1 *　10/2015　Brodsky ................. H04L 43/10
709/224
2019/0102239 A1 *　4/2019　Caldato ................... G06F 9/455
2020/0089533 A1 *　3/2020　Guha .................... G06F 9/5072
(Continued)

FOREIGN PATENT DOCUMENTS

CN　111279319 A　6/2020

OTHER PUBLICATIONS

Anonymous, "Logging Architecture," Kubernetes.io, retrieved May 5, 2023: pp. 1-11, <https://kubernetes.io/docs/concepts/cluster-administration/logging/>.

(Continued)

*Primary Examiner* — Hang Pan
(74) *Attorney, Agent, or Firm* — Kilpatrick Townsend & Stockton LLP

(57)　ABSTRACT

A computer can receive, by a software program executing on the processing device, a specification file drafted by a developer of a software application, the specification file having a declarative format and indicating a series of data retrieval tasks to be performed as part of a debugging process for debugging a problem with the software application. The computer can determine operations based on the series of data retrieval tasks indicated by the specification file, the operations being executable to perform the tasks. The computer can execute the one or more operations to perform the data retrieval tasks. By performing the data retrieval tasks, the computer can retrieve debugging information associated with one or more containers associated with the software application. The computer can transmit the retrieved debugging information to a debugging entity for use in debugging the problem with the software application.

20 Claims, 3 Drawing Sheets

(56) References Cited

U.S. PATENT DOCUMENTS

2022/0147436 A1 * 5/2022 Bhat ..................... G06F 21/552

OTHER PUBLICATIONS

Anonymous, "System Logs," Kubernetes.io, retrieved May 5, 2023: pp. 1-6, <https://kubernetes.io/docs/concepts/cluster-administration/system-logs/>.
Horovits, "A Practical Guide to Kubernetes Logging," logz.io, 2015-2023 Logshero Ltd., retrieved May 5, 2023: pp. 1-20, <https://logz.io/blog/a-practical-guide-to-kubernetes-logging/>.

* cited by examiner

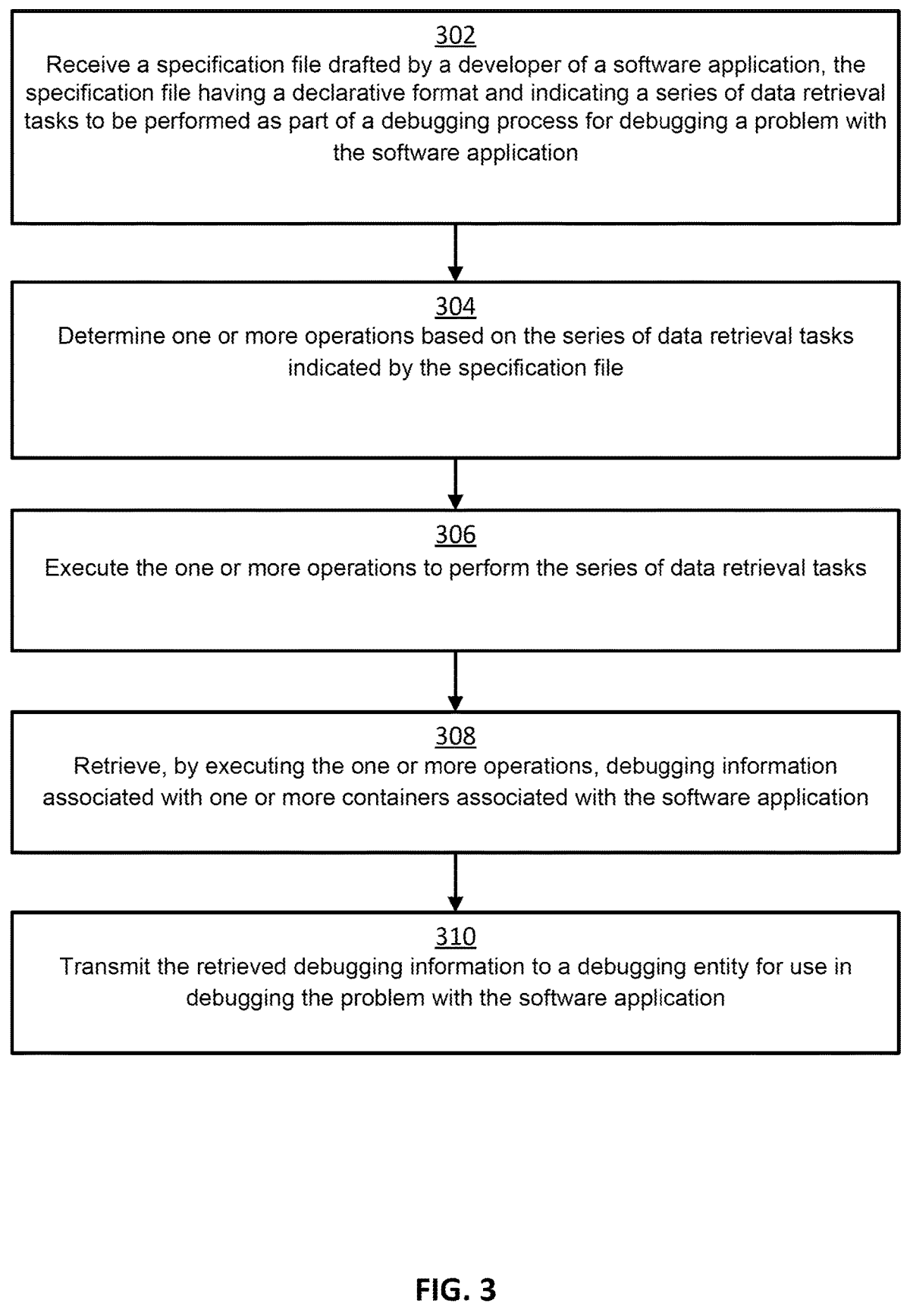

```
┌─────────────────────────────────────────────────────────────────┐
│                              302                                  │
│  Receive a specification file drafted by a developer of a         │
│  software application, the specification file having a            │
│  declarative format and indicating a series of data retrieval     │
│  tasks to be performed as part of a debugging process for         │
│  debugging a problem with the software application                │
└─────────────────────────────────────────────────────────────────┘
                               │
                               ▼
┌─────────────────────────────────────────────────────────────────┐
│                              304                                  │
│  Determine one or more operations based on the series of data     │
│  retrieval tasks indicated by the specification file              │
└─────────────────────────────────────────────────────────────────┘
                               │
                               ▼
┌─────────────────────────────────────────────────────────────────┐
│                              306                                  │
│  Execute the one or more operations to perform the series of      │
│  data retrieval tasks                                             │
└─────────────────────────────────────────────────────────────────┘
                               │
                               ▼
┌─────────────────────────────────────────────────────────────────┐
│                              308                                  │
│  Retrieve, by executing the one or more operations, debugging     │
│  information associated with one or more containers associated    │
│  with the software application                                    │
└─────────────────────────────────────────────────────────────────┘
                               │
                               ▼
┌─────────────────────────────────────────────────────────────────┐
│                              310                                  │
│  Transmit the retrieved debugging information to a debugging       │
│  entity for use in debugging the problem with the software        │
│  application                                                      │
└─────────────────────────────────────────────────────────────────┘
```

FIG. 3

AUTOMATICALLY RETRIEVING DEBUGGING INFORMATION BASED ON A DECLARATIVE SPECIFICATION FOR DEBUGGING A SOFTWARE APPLICATION

TECHNICAL FIELD

The present disclosure relates generally to debugging software applications. More specifically, but not by way of limitation, this disclosure relates to automatically retrieving debugging information based on a declarative specification for debugging a software application.

BACKGROUND

Software applications can run into problems (e.g., bugs) while executing. A developer can locate these problems by initiating a debugging process associated with the software application. Debugging the software application can involve examining source code and/or error logs associated with the software application to locate the bug. Once the bug has been located, the developer can modify the software application to resolve the bug. In certain situations, the developer may not have direct access to the error logs.

BRIEF DESCRIPTION OF THE DRAWINGS

FIG. 3 is a flow chart of a process for automatically retrieving debugging information based on a declarative specification for debugging a software application.

DETAILED DESCRIPTION

Figure 1:
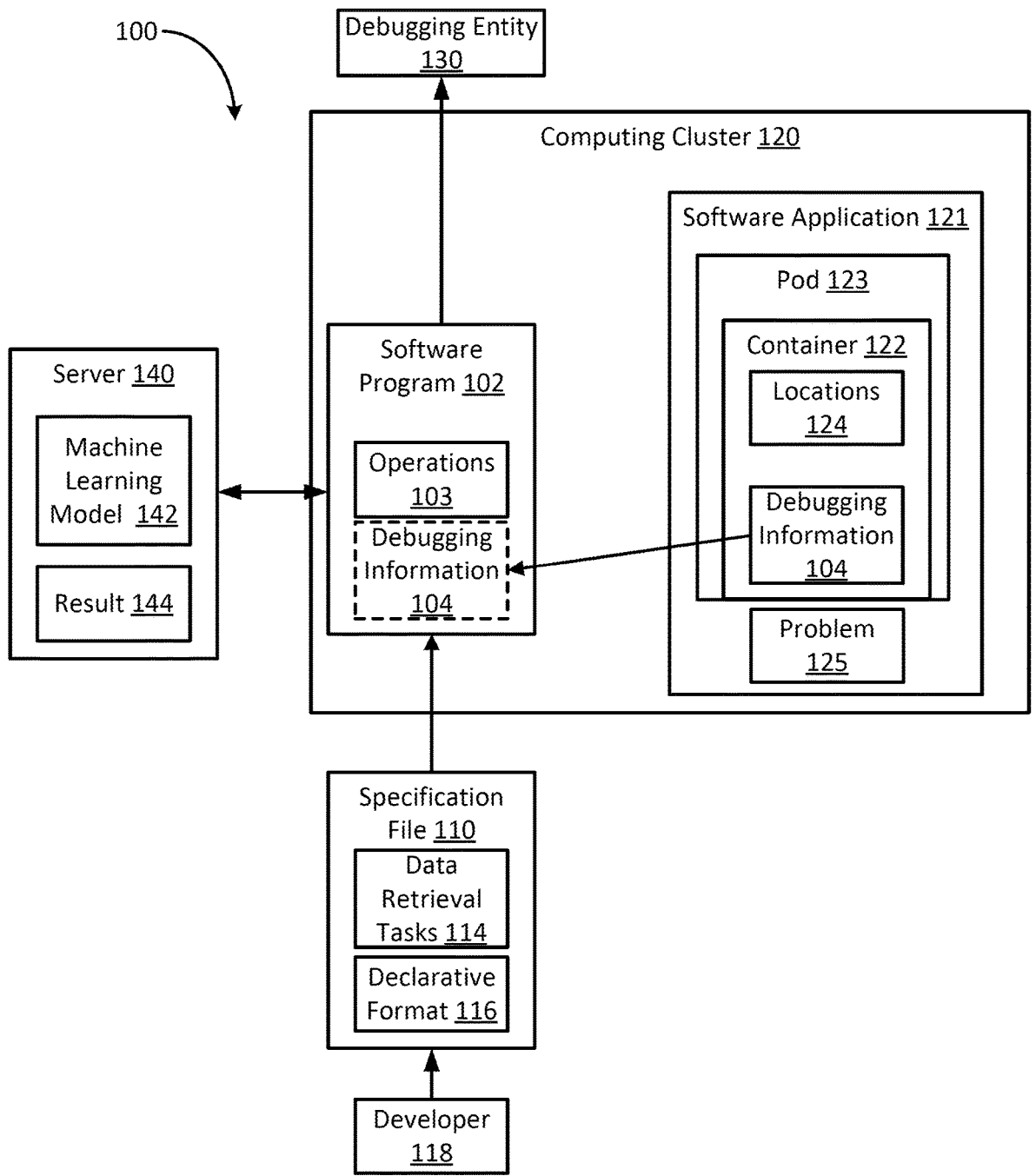
FIG. 1 is a block diagram of an example of a system for automatically retrieving debugging information based on a declarative specification for debugging a software application.

After a developer creates a software application, the developer can release the software application to an end user that can execute the software application in a distributed computing environment, such as a computing cluster. While executing, the software application can exhibit a problem, such as a bug. As an example, the software application may abruptly shut down during execution. To help understand and fix the bug, it may be desirable to gather different types of information, such as log data, from various sources in the distributed computing environment. Because the developer does not have access to the distributed computing environment of the end user, normally the developer tells the end user which information to collect and instructs the end user on how to gather and package the information. The end user then manually collects and packages the information and returns it to the developer. This can be a challenging, time consuming, and error-prone process, particularly where the end user is not technically savvy. Such end users may misinterpret instructions, fail to gather the correct information, and potentially make changes to their environment that may be detrimental to its operation.

To help simplify the above process, developers can provide the end user with a script written in a programming language (e.g., C++ or Java) to execute in their distributed computing environment. The script can be executed to automatically gather the required information. Although this is faster, it is still problematic. These scripts may not be well understood by those unfamiliar with computer programming, in which case the end users may be left to execute unfamiliar scripts that they do not understand on their computing systems, which is undesirable. Additionally, requiring developers to manually write scripts for the end user may consume unnecessary amounts of time and computing resources.

Some examples of the present disclosure can overcome the aforementioned problems by using declarative specifications, rather than programming scripts, to automatically retrieve information needed for debugging a software application. For example, a developer can draft a specification file that can indicate one or more data retrieval tasks that are to be performed as part of the debugging process. The specification file can be drafted in a declarative format that can be human-readable and user-friendly, thereby enabling a user of the software application to make changes to the specification file if necessary. The developer can then provide the specification file to an end user, along with a software program (e.g., an interpreter program) to run in their distributed computing environment. Because of the human-readable format of the specification file, the end user can easily determine exactly what operations will be performed in their computing environment. When executed, the software program can ingest the specification file from the developer, interpret the specification file, determine one or more operations to execute based on the specification file, and execute the operations in the distributed computing environment, thereby performing the data retrieval tasks automatically to retrieve the information needed for debugging (e.g., log data). In some examples, the software program can operate without requiring user input, other than the user selecting the specification file. For example, the software program can execute a command-line tool on a user's computing device that can determine and perform the operations rather than requiring the user to manually write, edit, or execute any scripts. After retrieving the debugging information, the software program can transmit the debugging information to a debugging entity (e.g., the developer).

In some examples, the specification file can include one or more locations associated with the debugging information. For example, the specification file can include a file path that is likely to correspond to one or more logs. The specification file can have a declarative format that can include strings of text corresponding to data retrieval tasks that can be performed.

In some examples, the software program may be an operator executing in a Kubernetes environment (or any other suitable container environment). Kubernetes is a container orchestration platform configured to help manage containers (e.g., relatively isolated virtual environments) in distributed computing environments, such as cloud computing environments. An operator, in the Kubernetes context, is software for automating various repeatable tasks, such as deployment, scaling, and backup of software resources. Each operator can be assigned to manage a software resource, such as a stateful application. Once deployed, operators can create, configure, and manage instances of their assigned software resources on behalf of a user in a declarative way. The operator can ingest the specification file and perform the operations.

In some examples, the specification file can be uploaded to a code repository associated with the software application by a developer of the software application. The specification file can be downloaded from the code repository by a user of the software application and can be subsequently executed by the user in their computing environment.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 that can automatically retrieve debugging information based on a declarative specification for debugging a software application 121. The system 100 can include a software program 102 that can execute on one or more processing devices and can be stored in one or more non-transitory computer-readable memories. The software program 102 can be an operator executing in a Kubernetes environment (or any other suitable container environment). In some examples, the software application 121 can be a cloud application distributed across a computing cluster 120 that is operated by an entity other than the developer 118 of the software application 121.

The software program 102 can receive a specification file 110. The specification file 110 can be drafted by the developer 118 of the software application 121. Additionally or alternatively, the specification file 110 can be generated in response to a request issued by the developer 118. The specification file 110 can include a declarative format 116. For example, the specification file 110 can be a YAML file or any other suitable file having a declarative format 116.

The declarative format 116 can be readable and modifiable by a user of the software application 121. For example, a specification file 110 drafted in a declarative format 116 can involve human-readable variables and corresponding values that the user of the software application 121 can modify. In some examples, the declarative format 116 can be drafted to be readable and usable by non-technical users of the software application 121. For example, a user can input strings of text indicating file paths corresponding to files or directories in the computing cluster 120 that may contain debugging information. Thus, the declarative format 116 is different from a programming language (e.g., C++ or Java) in which source code for the software application 121 may be drafted. In some examples, the specification file 110 having the declarative format 116 can be displayed to the user via a graphical user interface. For example, the user can view and modify the specification file 110 via the graphical user interface.

The specification file 110 can indicate a series of data retrieval tasks 114 to be performed as part of a debugging process for debugging a problem 125 associated with the software application 121. The software program 102 can determine, based on the series of data retrieval tasks 114 indicated by the specification file 110, one or more operations 103 to be performed. The software program 102 can execute the operations 103 to perform the series of data retrieval tasks 114.

The software program 102 can, by executing the operations 103, retrieve debugging information 104 associated with one or more containers 122 associated with the software application 121. In some examples, the software application 121 can execute on a single container 122. In some examples, the software application 121 can include multiple servers (e.g., microservices or serverless functions) that are distributed across multiple containers 122. In some examples, the software application 121 can be distributed across multiple pods 123, each pod 123 having one or more containers 122.

In some examples, the debugging information 104 may include stdout logs associated with the software application 121. Each stdout log can include output data written to a stdout stream corresponding to one of the containers 122 of the software application 121. Additionally or alternatively, the debugging information 104 may be stderr logs associated with the software application 121. Each stderr log can include error data written to a stderr stream corresponding to one of the containers 122 of the software application 121.

In some examples, the operations 103 can include retrieving debugging information 104 from the one or more containers 122. In some examples, the one or more operations 103 can include logging into a pod 123 that includes the one or more containers 122. For example, logging into the pod 123 can involve performing an operation 103 to transmit a password to a pod manager that is configured to manage the pod 123 and the containers 122 within the pod 123. Additionally, the operations 103 can include retrieving information indicating a state of the one or more containers 122 in the pod. The software program 102 can package and transmit the retrieved debugging information 104 to a debugging entity 130 for use in debugging the problem 125 with the software application 121. Packaging the retrieved data may involve rearranging or reformatting the retrieved data for delivery to the debugging entity 130. In some examples, the debugging entity 130 can be a debugging server or a human developer.

In some examples, the software program 102 can transmit the debugging information 104 to a machine learning model 142 (e.g., a neural network or natural language processing model) executing on a server 140. The server 140 may be internal to the computing cluster 120 that the software program 102 is executing on. Alternatively, the server 140 may be external to the computing cluster 120 on which the software program 102 is executing. The server 140 can provide the debugging information 104 as input to the machine learning model 142. The machine learning model 142 can analyze the debugging information 104 to generate an output. The server 140 can generate a result 144 based on an output of the machine learning model 142. In some examples, the machine learning model 142 can include a supervised learning model or an unsupervised learning model. For example, the machine learning model 142 can be trained on labeled historical data, such as historical sets of specification files. In some examples, the machine learning model 142 can include a support vector machine, a deep learning model, a neural network, a Bayesian classification model, or any other suitable supervised learning model, or any combination thereof.

In some examples, the output from the machine learning model 142 can be a value or series of values that have been determined by the machine learning model 142 based on the debugging information 104. The result 144 can be an identification of a problem 125 in the software application 121. In some examples, the result 144 can include a recommended course of action that can be taken to resolve the problem 125. In some examples, the machine learning model 142 can be a natural-language processing model. The natural-language processing model can analyze strings of text in the debugging information 104 to determine the result 144 based on the contents of the text.

The software program 102 can receive the result 144 from the server 140. The software program 102 can, based on the result 144, identify the one or more problems 125 (e.g., errors or faults) associated with the software application 121 and provide them to the debugging entity 130. In some examples, the software program 102 can determine the identification of the one or more problems 125 in the debugging information 104 and transmit the debugging information 104 to the debugging entity 130.

Figure 2:
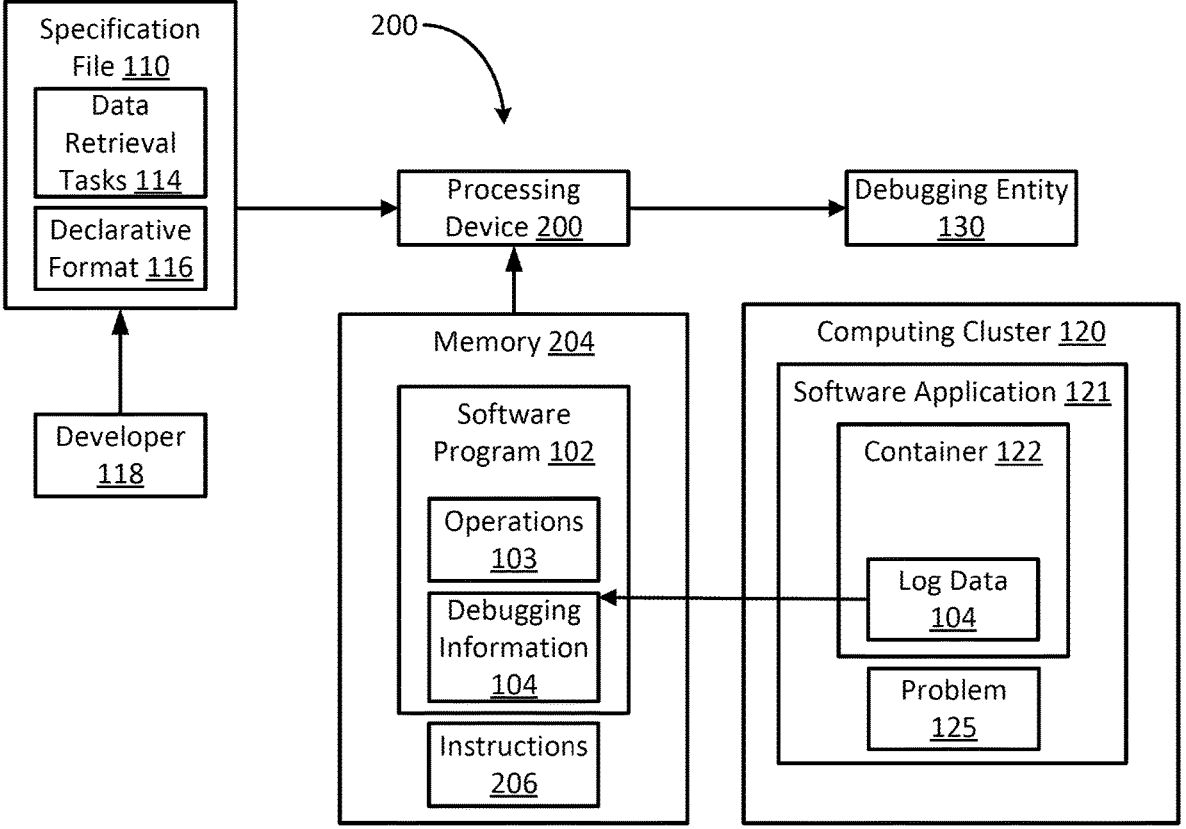
FIG. 2 is a block diagram of an example of a system for automatically retrieving debugging information based on a declarative specification for debugging a software application.

FIG. 2 is a block diagram of an example of a system 200 for automatically retrieving debugging information based on a declarative specification for debugging a software application 121 according to some aspects of the present disclosure. The system 200 can include a processing device 202 coupled to a memory 204. The processing device 202 can include one or more processors. Examples of the processing devices 202 include a Field-Programmable Gate Array (FPGA), an application-specific integrated circuit (ASIC), or a microprocessor. The processing device 202 can execute instructions 206 stored in the memory 204 to perform one or more operations. In some examples, the instructions 206 can include processor-specific instructions generated by a compiler or an interpreter from code written in any suitable computer-programming language, such as C, C++, C #, and Java.

The memory 204 can include one memory device or multiple memory devices. The memory 204 can be volatile or non-volatile, in that the memory 204 can retain stored information when powered off. Examples of the memory 204 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processing devices 202 with the instructions 206 or other program code. Non-limiting examples of a computer-readable medium include magnetic disks, memory chips, ROM, random-access memory (RAM), an ASIC, a configured processing device, optical storage, or any other medium from which a computer processing device can read the instructions 206.

The processing device 202 can receive a specification file 110. The specification file 110 can be drafted by a developer 118 of the software application 121. Additionally or alternatively, the specification file 110 can be generated in response to a request issued by the developer 118. The specification file 110 can be drafted in a declarative format 116. For example, the specification file 110 can be a YAML file or a JSON file. The specification file 110 can indicate a series of data retrieval tasks 114 to be performed as part of a debugging process for debugging a problem 125 associated with the software application 121. The software program 102 can determine, based on the series of data retrieval tasks 114 indicated by the specification file 110, one or more operations 103 to be performed. The software program 102 can execute the operations 103 to perform the series of data retrieval tasks 114.

The processing device 202 can, by performing the operations 103, retrieve debugging information 104 associated with one or more containers 122 associated with the software application 121. Subsequent to receiving the debugging information 104, the processing device 202 can transmit the debugging information 104 to a debugging entity 130. In some examples, the debugging entity 130 can be a debugging server. Additionally or alternatively, the debugging entity 130 can be the developer 118 or an entity associated with the developer 118.

FIG. 3 is a flow chart of a process for automatically generating operations 103 to retrieve debugging information for debugging a software application 121. While FIG. 3 depicts a certain sequence of steps for illustrative purposes, other examples can involve more steps, fewer steps, different steps, or a different order of the steps than is depicted in FIG. 3. The steps of FIG. 3 are described below with reference to components of FIG. 1 and FIG. 2.

At block 302, the processing device 202 (e.g., executing the software program 102) receives a specification file 110. The specification file 110 can be drafted by the developer 118 of the software application 121. Additionally or alternatively, the specification file 110 can be drafted by someone else with suitable knowledge. The specification file 110 can be drafted in a declarative format 116. For example, the specification file 110 can be a YAML file, a JSON file, or any other suitable file having a declarative format 116. The specification file 110 can indicate a series of data retrieval tasks 114 to be performed as part of a debugging process for debugging a problem 125 associated with the software application 121.

At block 304, the processing device 202 determines one or more operations 103 to be performed based on the series of data retrieval tasks 114 indicated by the specification file 110. In some examples, the processing device 202 can access a lookup table that can map data retrieval tasks 114 to corresponding operations 103 that the processing device 202 can execute to perform the data retrieval tasks 114. In some examples, the processing device 202 can read data in the specification file 110 that corresponds to a data retrieval task 114. The processing device 202 can generate, based on the data in the specification file 110, a query that the processing device 202 can transmit to a database to retrieve a corresponding operation 103.

Determining one or more operations 103 to be performed can involve generating scripts that are executable by the processing device 202. For example, the processing device 202 can automatically generate a script or a portion of a script corresponding to each data retrieval task 114 indicated by the specification file 110. For example, the processing device 202 can identify a data retrieval task 114 based on the specification file 110. Upon determining the data retrieval task 114 based on the specification file 110, the processing device 202 can determine a script or a portion of a script to execute in order to perform the data retrieval task 114. For example, the processing device 202 can access a database that includes generic template scripts that can be duplicated and modified to correspond to the specific data retrieval task 114 indicated by the specification file 110.

At block 306, the processing device 202 executes the operations 103 to perform the series of data retrieval tasks 114. The data retrieval tasks 114 can include querying a container 122 for a particular piece of data, retrieving a piece of data from a container 122, transmitting a passphrase to a container 122, or any other suitable data retrieval tasks 114. In some examples, the operations 103 can include executing one or more scripts corresponding to one or more of the data retrieval tasks 114. In some examples, the processing device 202 can generate an output that is viewable by the developer 118 for allowing the developer 118 to monitor the progress of the software program 102.

At block 308, the processing device 202 retrieves debugging information 104 associated with one or more containers 122 associated with the software application 121. The processing device 202 retrieves this debugging information 104 by executing the one or more operations. In some examples, the debugging information 104 may include stdout logs associated with the software application 121. Each stdout log can include output data written to a stdout stream corresponding to one of the containers 122 of the software application 121. Additionally or alternatively, the debugging information 104 may be stderr logs associated with the software application 121. Each stderr log can include error data written to a stderr stream corresponding to one of the containers 122 of the software application 121. In some examples, the operations 103 can include retrieving debugging information 104 from the one or more containers 122. In some examples, the one or more operations 103 can include logging into a pod 123 that includes the one or more containers 122. For example, logging into the pod 123 can involve performing an operation 103 to transmit a password to a pod manager that is configured to manage the pod 123 and the containers 122 within the pod 123. Additionally, the operations 103 can include retrieving information indicating a state of the one or more containers 122 in the pod.

At block 310, the processing device 202 transmits the retrieved debugging information 104 to a debugging entity 130 for use in debugging the problem 125 with the software application 121. The debugging entity 130 can use the retrieved debugging information 104 to determine a root cause of the problem 125 and may generate an update (e.g., patch) configured to resolve the problem 125. In some examples, the debugging entity 130 can be a piece of debugging software executing on a separate computing device from the computing cluster 120.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A method comprising:
storing, by a computing environment of an end user of a software application, debugging information in multiple storage locations within the computing environment, wherein the debugging information is associated with an execution of the software application in the computing environment;
receiving, by the computing environment and from a source computing device that is external to the computing environment, a specification file having a declarative format and indicating a series of data retrieval steps to be performed as part of a debugging process for debugging a problem with the software application, wherein the series of data retrieval steps involve retrieving the debugging information from the multiple storage locations, and wherein the specification file is provided by a developer of the software application, the developer being different from the end user;
receiving, by the computing environment, a software program that is separate from the software application; and
after the computing environment stores the debugging information in the multiple storage locations and receives the specification file:
executing the software program in the computing environment, wherein the software program is configured to access the specification file and extract the series of data retrieval steps from the specification file;
executing, by the software program, one or more data retrieval operations corresponding to the series of data retrieval steps extracted from the specification file to retrieve the previously stored debugging information from the multiple storage locations; and
transmitting, by software program, the retrieved debugging information to a target computing device associated with a debugging entity for use in debugging the problem with the software application, wherein the target computing device is external to the computing environment.

2. The method of claim 1, further comprising:
extracting, by the software program and from the specification file, the multiple storage locations associated with the debugging information.

3. The method of claim 1, wherein the software application is a cloud application executing on a computing cluster that is operated by an entity other than the developer of the software application.

4. The method of claim 1, wherein the software program is an operator executing in a Kubernetes environment.

5. The method of claim 1, further comprising:
transmitting, by the software program, the debugging information to a natural-language processing model executing on a server, the natural-language processing model being configured to analyze the debugging information and return a result indicating one or more problems associated with the software application;
receiving, by the software program, the result from the server;
identifying, by the software program, the one or more problems associated with the software application based on the result; and
transmitting, by the software program, an indication of the one or more problems associated with the software application to the debugging entity.

6. The method of claim 1, wherein the one or more data retrieval operations involve retrieving the debugging information from multiple containers.

7. The method of claim 1, wherein the one or more data retrieval operations involve:
logging in to a pod that includes one or more containers; and
retrieving information indicating a state of the one or more containers from the pod, the state being part of the debugging information.

8. The method of claim 1, wherein the source computing device is different from the target computing device, wherein the developer is different from the debugging entity, and wherein execution of the software program is triggered by the end user in the computing environment.

9. A non-transitory computer-readable medium comprising program code that is executable by a processing device for causing the processing device to:
store, by a computing environment of an end user of a software application, debugging information in multiple storage locations within the computing environment, wherein the debugging information is associated with an execution of the software application in the computing environment;
receive, by the computing environment and from a source computing device that is external to the computing environment, a specification file having a declarative format and indicating a series of data retrieval steps to be performed as part of a debugging process for debugging a problem with the software application, wherein the series of data retrieval steps involve retrieving the debugging information from the multiple storage locations, and wherein the specification file is provided by a developer of the software application, the developer being different from the end user;

receive, by the computing environment, a software program that is separate from the software application; and after the computing environment stores the debugging information in the multiple storage locations and receives the specification file:

execute the software program in the computing environment, wherein the software program is configured to access the specification file and extract the series of data retrieval steps from the specification file;

execute, by the software program, one or more data retrieval operations corresponding to the series of data retrieval steps extracted from the specification file to retrieve the previously stored debugging information from the multiple storage locations; and transmit, by software program, the retrieved debugging information to a target computing device associated with a debugging entity for use in debugging the problem with the software application, wherein the target computing device is external to the computing environment.

10. The non-transitory computer-readable medium of claim 9, wherein the program code is further executable by the processing device for causing the processing device to:

extract, from the specification file, the multiple storage locations associated with the debugging information.

11. The non-transitory computer-readable medium of claim 9, wherein the program code corresponds to an operator executing in a Kubernetes environment.

12. The non-transitory computer-readable medium of claim 9, wherein the program code is further executable by the processing device for causing the processing device to:

transmit the debugging information to a natural-language processing model executing on a server, the natural-language processing model being configured to analyze the debugging information and return a result indicating one or more problems associated with the software application;

receive the result from the server;

identify the one or more problems associated with the software application based on the result; and transmit an indication of the one or more problems associated with the software application to the debugging entity.

13. The non-transitory computer-readable medium of claim 9, wherein the one or more data retrieval operations involve retrieving the debugging information from multiple containers.

14. The non-transitory computer-readable medium of claim 9, wherein the one or more data retrieval operations involve:

logging in to a pod that includes one or more containers; and retrieving information indicating a state of the one or more containers from the pod, the state being part of the debugging information.

15. A system comprising:

a processing device; and a memory including instructions that are executable by the processing device for causing the processing device to:

store, by a computing environment of an end user of a software application, debugging information in multiple storage locations within the computing environment, wherein the debugging information is associated with an execution of the software application in the computing environment;

receive, by the computing environment and from a source computing device that is external to the computing environment, a specification file having a declarative format and indicating a series of data retrieval steps to be performed as part of a debugging process for debugging a problem with the software application, wherein the series of data retrieval steps involve retrieving the debugging information from the multiple storage locations, and wherein the specification file is provided by a developer of the software application, the developer being different from the end user;

receive, by the computing environment, a software program that is separate from the software application; and after the computing environment stores the debugging information in the multiple storage locations and receives the specification file:

execute the software program in the computing environment, wherein the software program is configured to access the specification file and extract the series of data retrieval steps from the specification file;

execute, by the software program, one or more data retrieval operations corresponding to the series of data retrieval steps extracted from the specification file to retrieve the previously stored debugging information from the multiple storage locations; and transmit, by software program, the retrieved debugging information to a target computing device associated with a debugging entity for use in debugging the problem with the software application, wherein the target computing device is external to the computing environment.

16. The system of claim 15, wherein the instructions are further executable by the processing device for causing the processing device to:

extract, from the specification file, one or more storage locations of the multiple storage locations associated with the debugging information.

17. The system of claim 15, wherein the software application is a cloud application executing on a computing cluster that is operated by an entity other than the developer of the software application.

18. The system of claim 15, wherein the instructions correspond to an operator in a Kubernetes environment.

19. The system of claim 15, wherein the instructions are further executable by the processing device for causing the processing device to:

transmit the debugging information to a natural-language processing model executing on a server, the natural-language processing model being configured to analyze the debugging information and return a result indicating one or more problems associated with the software application;

receive the result from the server;

identify the one or more problems associated with the software application based on the result; and transmit an indication of the one or more problems associated with the software application to the debugging entity.

20. The system of claim 15, wherein the one or more data retrieval operations involve retrieving the debugging information from multiple containers.

* * * * *